(No Model.)
E. H. BATES.
SHIFTING SEAT FOR VEHICLES.
No. 396,062. Patented Jan. 15, 1889.
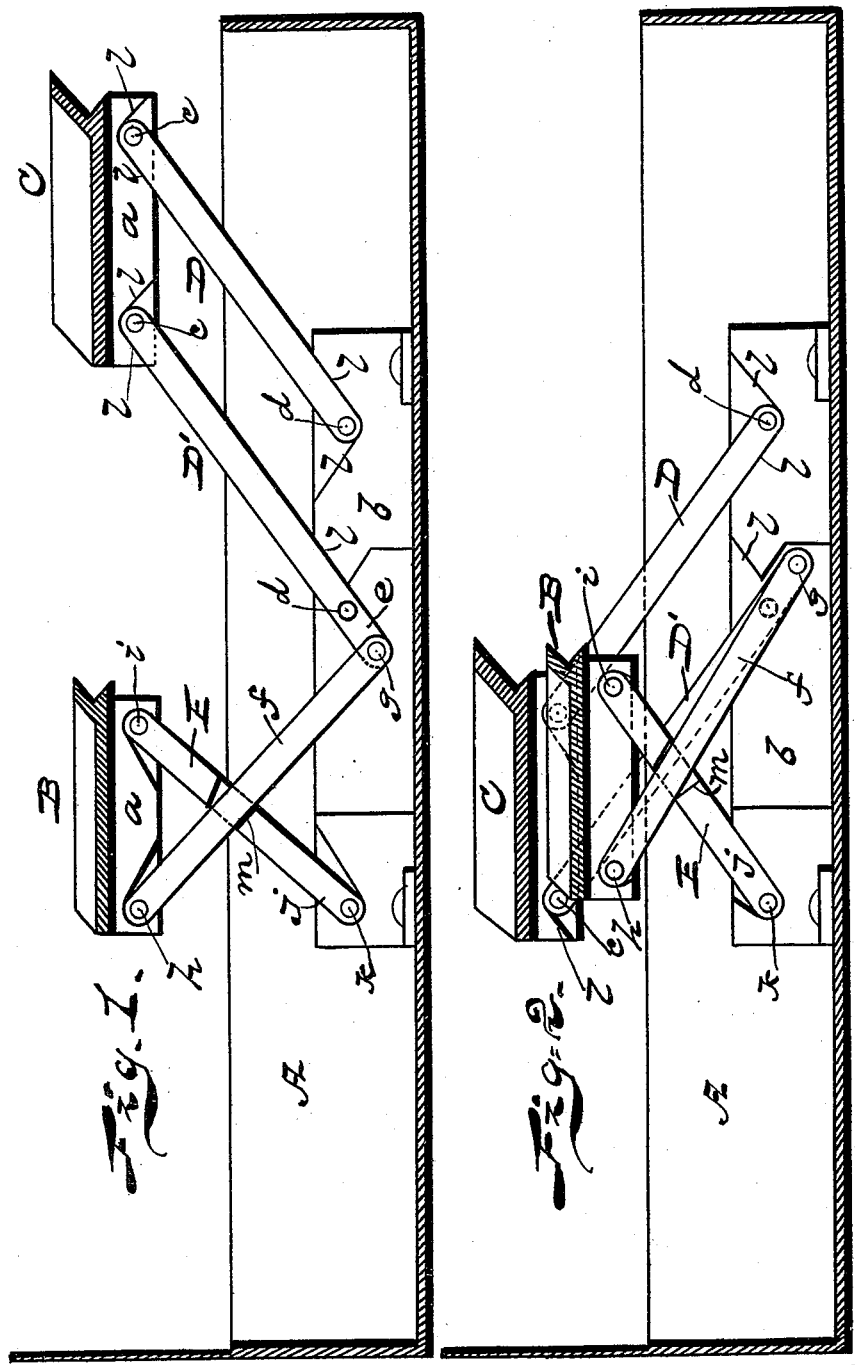
WITNESSES,
O. L. Blau
John N. Walker,
INVENTOR,
E. H. Bates

UNITED STATES PATENT OFFICE.

EMORY H. BATES, OF WASHINGTON, DISTRICT OF COLUMBIA.

SHIFTING SEAT FOR VEHICLES.

SPECIFICATION forming part of Letters Patent No. 396,062, dated January 15, 1889.

Application filed March 29, 1888. Serial No. 268,748. (No model.)

*To all whom it may concern:*

Be it known that I, EMORY H. BATES, a citizen of the United States, residing at Washington, District of Columbia, have invented certain new and useful Improvements in Shifting Seats for Vehicles; and I do hereby declare the following to be a full, clear, and exact description of the invention, such as will enable others skilled in the art to which it appertains to make and use the same.

This invention relates to improvements in shifting seats for vehicles; and it consists in the novel construction and combination and arrangement of the same, as will be further hereinafter described.

The annexed drawings, to which reference is made, illustrate my invention, in which—

Figure 1 represents a vertical longitudinal sectional view showing the seats arranged one in the front of the other; and Fig. 2 is also a vertical longitudinal sectional view showing the front seat beneath the hind seat, the latter having taken the place of the front seat.

Referring by letter to the accompanying drawings, A is a vehicle-body constructed in any desired form.

B designates the front seat, and C the hind seat. Secured to the under side of each of the seats are bearings $a$, and secured to the vehicle-body is also a bearing, $b$.

D D' represent bars, which are pivoted at $c$ to the bearing on the under side of the rear seat, and the same are also pivoted at $d\,d$ to the bearing secured to the body, as shown in the drawings. The bar D' has an extension, $e$, which is pivoted to the lower end of the cross-bar $f$, as at $g$, and this bar $f$ is in turn pivoted at its upper end to the bearing $a$ on the under side of the front seat, as at $h$.

E represents a bar which is pivoted at its upper end to the bearing on the under side of the front seat, as at $i$, and its lower end, $j$, is pivoted to the bearing secured to the body, as shown at $k$. These bearings are each provided with bearing surfaces or lugs $l$, which serve to support the pivoted bars and the seats in position. The cross-leg or bar E is provided with a bearing-surface, $m$, or lugs, in which the bar $f$ has its movement when the seats are operated and which serves to lock the seats in position.

It will be seen that when a front seat only is desired the person simply shifts the rear seat forward, thus causing the rear bars to turn on their pivots, thereby drawing the bar $f$ downwardly and rearwardly, causing said bar and the bar E to act on their pivots, and thus causing the front seat to drop, after which the hind seat takes its place, the front seat being beneath said rear seat, as shown in Fig. 2 of the drawings.

When it is desired to use both seats, the rear seat is thrown back, the bars turning on their pivots, and the front seat rises to its normal position, as shown in Fig. 1 of the annexed drawings; and it is simple in construction, easily operated, durable, and at the same time cheap to manufacture Having described my invention, what I claim, and desire to secure by Letters Patent, is—

1. The combination, in a shifting-seat vehicle, of the cross-bars $f$ E, pivoted at $h\,i$ to the front seat, and the bar E, pivoted at $k$ to the bearing $b$, and pivoted rear seat-bars, said bar $f$ pivoted directly to the extended end $e$ of the bar D', substantially as described.

2. The combination of the pivoted cross-bars provided with supporting lugs or bearings, and the pivoted rear seat-bars, said cross-bars and rear bar, D', connected directly to one another, as shown and described.

In testimony whereof I affix my signature in presence of two witnesses.

EMORY H. BATES.

Witnesses:
 W. T. DE MOTT,
 H. B. POLKINHORN.